United States Patent Office 3,236,800
Patented Feb. 22, 1966

3,236,800
TREATING A RUBBER LATEX WITH A LIQUID HYDROCARBON AND OXYGEN CONTAINING COMPOUND
Jacques A. Waterman and Gerardus E. La Heij, Amsterdam, Netherlands, assignors to Shell Oil Company, New York, N.Y., a corporation of Delaware
No Drawing. Filed Aug. 27, 1962, Ser. No. 219,778
Claims priority, application Netherlands, Dec. 28, 1961, 272,986; Jan. 22, 1962, 273,805
12 Claims. (Cl. 260—29.7)

The invention relates to a process for treating aqueous dispersions of one or more organic macromolecular substances with organic liquids. The invention relates in particular to the treatment of latices obtained directly by emulsion polymerization, such as latices of synthetic rubbers, and is aimed in particular at the agglomeration of the solid macromolecular particles. The invention also relates to the treatment of mixtures of two or more different latices or of latices containing part of the macromolecular substance or substances in solution, and/or filler substances, such as carbon black. The new process also comprises the treatment of latices formed entirely or partly by emulsifying polymer solutions in water, including latices consisting of mixtures of dispersions thus obtained and latices prepared by emulsion polymerization.

The process according to the invention aims in particular at the preparation of stable dispersions of synthetic rubbers, such as styrene/butadiene rubbers, having a high content of solid matter, especially of latices which, owing to their high content of solid matter, are suitable for the preparation of foam rubbers, if so desired, of foam rubbers containing reinforcing fillers, such as carbon black.

The new process is also very suitable for preparing coagulates containing very homogeneously distributed fillers, in particular of synthetic rubber coagulate containing carbon black.

It is known that the solid particles of latices of synthetic rubbers obtained by emulsion polymerization, for instance of styrene butadiene rubbers, can be enlarged by adding to the latices, after polymerization has been concluded, a given quantity of a swelling agent consisting of one or more aliphatic, aromatic or halogenated hydrocarbons with a boiling point between —50° C. and +200° C. Of a number of the said swelling agents, such as benzene, toluene, xylene, cyclohexane, chloroform and carbon tetrachloride, the value of the Flory-Huggins interaction parameter, $\chi$, in relation to butadiene/styrene rubbers is lower than 0.6 (Trans. Faraday Soc. 54 (1958) 1731–1747, Rubber Chem. and Technol. 34 (1961) 901 and J. Polymer Science 46 (1960) 550).

The parameter as referred to in the specification and claims (as well as in the above references) has been determined for a number of solvent-rubber combinations. It is described by the relationship $$\chi = 0.3 + \frac{V_1(\partial_1 - \partial_2)^2}{RT}$$

Wherein
$\chi$ is the polymer-solvent interaction parameter;
$V_1$ is the molar volume of the solvent at 25° C.;
$\partial_1$ is the solubility parameter of the solvent;
$\partial_2$ is the solubility parameter of the rubber;
T is the temperature in degrees Kelvin; and
R is the gas constant, 1.987 cal./mol/°K.

In this process losses of coagulum are likely to occur, while beneficial effects are only obtained if comparatively highly concentrated latices are used.

If the solid particles of dilute latices are also to be enlarged by treatment with the said swelling agents, the amounts of swelling agent required are considerably larger than those indicated in the description of the aforesaid process. The effects are then, moreover, less pronounced and the losses by coagulation greater.

Enlargment of particles of synthetic rubber latices whose pH is at least 9, can be effected by first reducing the pH to 4.5–7.5, then adding an aliphatic or cycloaliphatic alcohol, such as methyl, ethyl, propyl, amyl, hexyl, cyclohexyl or octyl alcohol and then again raising the pH to at least 9. According to another process, an increase of the average particle size of synthetic rubber latices is procured by the addition of an aqueous acetone solution. These processes, too, have the disadvantage that if effective particle enlargement is to be achieved, so much of the aforesaid alcohols or so much acetone has to be added that again partial flocculation often results.

A process has now been found in which the disadvantages of the above-mentioned known methods are obviated, while very effective particle enlargment can at the same time be achieved without the necessity of starting from latices previously concentrated; a process, too, by which it is simple to incorporate other macromolecular substances and/or fillers in the latices, or by which coagulates are obtained that can be produced from intimate mixtures of various macromolecular substances or of macromolecular substances and fillers.

According to the process claimed the solid latex particles are put into contact both with a component A, to be more closely defined and with a component B, also to be more closely defined (including the alcohols mentioned above and also acetone), after which the two components are removed from the dispersion.

The definition of component A is: one or more organic compounds which:

(1) Do not give an acid reaction towards the water phase;

(2) Have a boiling point between —50° C. and +200° C.;

(3) At the temperature and pressure at which the treatment is effected, have a solubility of at most 10 grams in 100 ml. of water, and (4) Are so chosen that, in relation to the macromolecular substance or in relation to at least one of the macromolecular substances the value of the Flory-Huggins interaction parameter, $\chi$ (see Trans. Faraday Soc. 54 (1958) 1731–47 and Rubber Chem. and Technol. 34 (1961) 901) of the organic compound or the volume average $x$ value of the collective organic compounds is lower than 0.6.

Component B may be more closely defined as consisting essentially of one or more organic compounds which do not give an acid reaction towards the water phase, have a boiling point between —50° C. and +195° C., and whose solubility at the temperature and pressure of the treatment is more than 10 g. in 100 ml. of water.

It is therefore in particular the choice of A that depends (in view of the $\chi$ value) on the nature of the macromolecular substances.

The process claimed may now be more closely described as a process for the treatment of aqueous dispersons of one or more solid organic macromolecular substances by mixing these dispersions with a component A as defined above and later removing this component from the dispersions, the characteristic feature being that (1) the dispersions, in the presence of A, are also in contact with a component B as also defined above, (2) in this treatment the ratio by weight of the sum of the macromolecular substance(s) and component A to the sum of water and component B is at most 5, and (3) at the end of the treatment component B is also removed from the dispersions.

The ratio by weight mentioned above under (2) is preferably between 0.5 and 3.

Contact with components A and B is generally made while the ingredients are vigorously stirred, for instance with the aid of a turbomixer. The duration of the contact need then not be longer than from one to a few minutes.

The effect of component A upon the macromolecular substances is mainly one of swelling, in addition to which, however, agglomeration also takes place if the latices are sufficiently concentrated. The function of component B consists principally in introducing into the water phase and/or into the phase of component A part of the emulsifiers or emulsifier acids present in the dispersions, in consequence of which, with the aid of relatively small quantities of component B, the agglomeration of the swollen particles usually is considerably promoted without causing coagulation.

If component A consists of more than one organic compound, the $\chi$ values of these compounds may differ from each other, provided the volume average $\chi$ value of the mixture of these compounds meets the requirement. Component A may therefore even contain a component A' consisting of one or more compounds whose $\chi$ value is 0.6 or more.

This component A' may be mixed with the dispersion at the same time as the other part of component A, and A' may then be regarded, for instance, as the diluent of the rest of A. Alternatively, A' may be added to the latex before or after the other component of A.

Component B is preferably put into contact with the dispersion simultaneously with component A or else after component A has been mixed with the dispersion. It is, however, also possible first to mix component B with the dispersion.

The latices to be treated according to the invention are preferably latices obtained by emulsion polymerization.

Latices obtained by emulsion polymerization are preferably not mixed with component A until polymerization has been concluded. Their mixing with component B is in those cases also preferably effected after polymerization. Addition of component B or of a mixture of component A and component B during polymerization, is also possible, however.

The temperature at which the treatment as claimed is carried out will generally be between 0° C. and 100° C. Lower and higher temperatures may also be applied, however. The pressure during the treatment will chiefly depend on the temperature applied and the boiling points of components A and B and will generally be chosen so that components A and B are liquid.

The dispersions to be treated are, in particular, latices obtained by emulsion polymerization at temperatures above 0° C., preferably with the aid of redox recipes at temperatures of 0–40° C.

The process according to the invention applies, in particular, to dispersions containing styrene/butadiene copolymers. In preparing these copolymers any ratio of styrene to butadiene may have been applied. Besides styrene/butadiene rubbers, copolymers containing more than 45% by weight of styrene and known by the name of "high-styrene resins" can be used. In addition, the macromolecular substances may be polybutadiene and polystyrene. Butadiene/acrylonitrile copolymers are also suitable, such as nitrile rubbers, and, in addition, neoprene, polyisoprene, polyvinyl chloride and polyvinyl esters, such as polyvinyl acetate.

In certain cases it may be important that there should be more than one macromolecular substance present in the dispersion to be treated, for instance more than one of the said polymers and/or copolymers. To this end one may, for instance, mix two or more dispersions of different macromolecular substances and subject the mixture to the treatment according to the invention. Thus, for instance, mixtures of nitrile rubber latices obtained by emulsion polymerization and polyvinyl chloride latices can very suitably be treated according to the new process.

The new process may also be applied for treating artificial latices obtained by dispersion in water of solutions or organic macromolecular compounds in organic solvents that do not show an acid reaction towards the water phase and which are then generally removed from the dispersions obtained. Artificial latices may be prepared, for instance, from solutions of natural rubber, polyisobutene, butyl rubber, rubber-like copolymers built up, entirely or predominantly from alpha olefins, for instance ethylene and propylene and/or butylene-1, furthermore cis-1,4-polyisoprene and cis-1,4-polybutadiene. The solutions of these polymers to be emulsified are generally the solutions obtained in solvent polymerizations. The artificial latices are then preferably mixed, before or during the treatment with A and B, with latices produced by emulsion polymerization.

By the process according to the invention, latices containing more than one macromolecular substance can also be produced by adding to the latices to be treated, before or during the contact with A and B, another organic macromolecular substance in the form of a solution. The solvent used for this purpose, like components A and B, must not show an acid reaction towards the water phase.

Usually the solvent chosen for the macromolecular substance to be added is one or more compounds of the type of component A and/or of component B, and preferably use is made of the same component A, the same component B or the same mixture of components A and B with which the latex is to be treated.

In certain cases, as, for instance, when a saponified polyvinyl acetate (hence a polyvinyl alcohol) is added, water may be used as the solvent.

It is also possible to use as solvent for the macromolecular substance to be added a component A', thus, a constituent of A, which is distinguished from the rest of component A in that its $\chi$ value, or volume average $\chi$ value, is at least 0.6. If so desired or if necessary, when such a solvent is used, the solution thus obtained of the macromolecular substance to be added may be dispersed in the remainder of component A, in component B or in a mixture thereof.

For component A, preferred, are those representatives that have a $\chi$ value in relation to the macromolecular substance, or to at least one of the macromolecular substances, of less than 0.5. Also in the presence of a component A' the volume average $\chi$ value of the collective constituents of component A is preferably lower than 0.5. Representatives that are particularly good A components for the treatment of styrene/butadiene rubbers and butadiene/acrylonitrile rubbers are benzene and the alkyl substituted benzenes, for instance toluene, xylene, cumene; furthermore, trichloromethane (chloroform) and tetrachloromethane (carbon tetrachloride). For styrene/butadiene rubbers and butyl rubbers saturated cycloaliphatic hydrocarbons with 5 or 6 carbon atoms in the molecule are also suitable representatives of component A.

In general, suitable representatives of component A' are mainly hydrocarbons or halogenated hydrocarbons, naturally insofar as they have a $\chi$ value of at least 0.6.

Examples of a component A that contains a constituent A' are, in the case of styrene/butadiene rubbers: commercial hexane, which contains cyclohexane among other compounds, and also mixtures of benzene and hexane.

As component B are particularly eligible: saturated alcohols with 1–4 carbon atoms, in particular isopropyl alcohol and also ketones, in particular acetone. Examples of compounds that are also very suitable as component B are methyl ethyl ketone, methyl alcohol, furfuryl alcohol, methyl Cellosolve (2-methoxyethanol), diacetone alcohol, dioxane, dimethyl ether, pyridine, nitromethane, ethylene chlorohydrin and methyl acetate.

The volume ratios of component A to component B to be applied are usually between 10:90 and 99:1.

When as component B monohydric saturated alcohols with 2–4 carbon atoms are used, for instance isopropyl alcohol, the ratio by volume of component A to component B is preferably between 70:30 and 95:5. This is a particular case when benzene, an alkyl benzene, trichloromethane or tetrachloromethane is used as component A.

If, under otherwise similar conditions, the alcohol is replaced by acetone, ratios by volume of A to B between 70:30 and 98:2 are preferred.

The process according to the invention is also applicable to latices containing pigments or fillers, in particular reinforcing filler substances, such as carbon black or certain resins, for instance phenol formaldehyde resins, urea formaldehyde resins, cumarone resins and mineral-oil-based resins. These latices, too, may have been produced by emulsion polymerization and/or as artificial latices from solutions. The fillers may be added before or during the treatment with A and B, for instance in the form of a dispersion in component A, in component B, in a mixture of components A and B, or in component A'. In this manner very intimate mixing of the filler materials with the macromolecular substances is ensured. It is, however, also quite possible to add a dispersion of the filler in water to the latex before contact with the said components. The filler dispersions mentioned are preferably stable dispersions, for instance dispersions obtained applying a dispersion stabilizer, for instance an emulsifier and/or a protective colloid.

Emulsifiers that are particularly eligible for preparing the dispersions to be treated according to the invention are the salts of fatty acids, rosin acids or branched monocarboxylic acids having 8–40 carbon atoms in the molecule. Other dispersion stabilizers such as other anionogenic, as well as cataionogenic or non-ionogenic emulsifiers and also protective colloids, can also be used for the emulsion polymerization or for the dispersion of solutions of macromolecular substances or for the dispersion of fillers in water or in one or more of the components A and B or constituents thereof.

The process according to the invention can also be carried out in the presence of one or more electrolytes. When latices obtained by emulsion polymerization are used, the electrolyte is preferably added before or during the polymerization. Examples of suitable electrolytes are potassium chloride, sodium chloride, trisodium phosphate, tripotassium phosphate, potassium pyrophosphate, potassium sulfate, sodium sulfate, sodium borate, lithium chloride, and in particular, ammonium salts, such as ammonium sulfate and ammonium carbonate.

The presence of electrolytes during the polymerization is desirable because this has a favorable effect upon the size of the polymer particles formed, while the viscosity of the reaction mixture is prevented from becoming too high.

In certain cases it may be advisable to concentrate the dispersions before the treatment with components A and B, for instance by film evaporation. The latices of styrene/butadiene rubbers, produced in the conventional way, as obtained upon emulsion polymerization after removal of the unconverted monomers, usually have a solids content of about 15–20% by weight. A latex of this kind may, for instance, be concentrated by evaporation to a solids content of about 30–45% by weight, without its viscosity becoming too high and/or flocculation occurring.

After treatment of the latices, whether concentrated or not, with components A and B according to the invention, it appears, in particular with latices of which the dimensions of the solid particles were small before the treatment, that these particles have been considerably enlarged. This is evident, for instance, from measurements, carried out upon the latices, of their optical density, particle size distribution, surface tension, or from comparative viscosity measurements with constant solids content.

The removal of components A and B from the treated dispersion may easily be effected, for instance, by steam stripping, by vacuum distillation or by steam-vacuum distillation.

If the removal is effected with the aid of steam, the combination and ratio of components A and B or of their constituents is preferably so chosen that they can be readily and completely removed as an azeotrope by means of steam. Thus, when benzene is applied as component A and isopropyl alcohol as component B an azeotrope is formed with steam, which azeotrope boils at 66.5° C. and whose composition is: 73.8% by weight of benzene, 18.7% by weight of isopropyl alcohol and 7.5% by weight of water.

Upon condensation of this mixture two layers are formed: a layer with a high benzene content, consisting of 79% w. of benzene, 19% w. of isopropyl alcohol and 2% w. of water, and a layer with a high water content, whose composition is: 1% w. of benzene, 33% w. of isopropyl alcohol and 77% w. of water. The amount of high-benzene phase is 92.6% w. of total condensate.

Thus, if after the phase separation, only the high-benzene phase is recycled to the process, $$\frac{0.79 \cdot 92.6}{73.8} \cdot 100 = 99.1\% \text{ of the benzene and}$$

$$\frac{0.19 \cdot 92.6}{18.7} \cdot 100 = 94\% \text{ of the isopropyl alcohol}$$

can be recovered.

If the entire condensate is recycled 100% of both of the components can be retrieved, but this of course raises the water content of the latices.

If the present process is applied to latices that have been made by emulsion polymerization in the presence of ammonium salts as the electrolyte, these salts are decomposed as soon as the latices are brought into contact with steam. Often contact with steam occurs twice, the first time being before the treatment according to the invention for the removal of monomer. Upon this decomposition the ammonium salts disappear either altogether, as when ammonium carbonate is used, or they leave behind only the acid from which they are derived, as in the case of ammonium sulfate.

After components A and/or B have been removed from the treated dispersions these can (again) be concentrated if so desired. The concentration can, for instance, be effected by evaporation (for instance, in a film evaporator) or by centrifuging, it being easily possible thus to obtain solids contents of more than 55% w., for instance, 60–71% w.

The latices thus produced are eminently suitable for preparing foams consisting of organic macromolecular substances, in particular foam rubbers. The foam rubbers may be made from foam-rubber latices obtained according to the invention. The latex foams initially formed, which are as yet unvulcanized, have high stability and a sufficiently low viscosity to ensure good filling of the molds in which they are vulcanized. The finished foam rubbers have a more homogeneous foam structure than the conventional foam rubbers and when they are compressed no wrinkles form on the surface and they have greater resilience.

If a reinforcing filler substance, such as carbon black, is incorporated in the latices by dispersing it in one or more of the components A and B or in their constituents by means of an emulsifier, dispersions may be obtained from which foam rubbers having improved mechanical properties are prepared.

The methods so far usually applied in industry for manufacturing foam-rubber latices are either difficult and expensive, as in the case of agglomeration by freezing out or less effective, time-consuming (40–60 hours), and of poor reproducibility and poor controllability as regards particle size distribution, as in the case of direct manufacture by emulsion polymerization applying high monomer concentrations.

The present process is easy and rapid and can, if so desired, be carried out continuously, also if the aim is to manufacture foam-rubber latices. The new process is highly effective and the particle size distribution is easy to control.

The present process can therefore very well be applied, besides for manufacturing foam-rubber latices, for preparing latices having a solids content of from 40-60% w., for which the amounts of components A and B to be applied may be smaller. These dispersions may be applied in dipping processes, in rubber carpet backing, in tire cord dipping, in applying rubber coatings to objects in general and in impregnating textile fabrics.

The particle size distribution in the latices obtained by the present process may, if so desired, be controlled by changing the pH and/or the quantities of components A and B. This distribution moves within wider limits according as the pH of the latex to be treated is lower and/or the amounts applied of components A and B are larger.

If the latex contains ammonium sulfate as the electrolyte, sulfuric acid is formed during the treatment with steam, as a result of which the pH of the latex is reduced.

The particle size distribution is also dependent on the total content of solids and on the particle size of the latex to be treated.

A particular advantage of the process according to the invention is that mechanically very stable latices can be reproducibly obtained, which may be stored for a long time, for instance at 80° C., without coagulating. Furthermore, the new process allows of an ample choice of emulsifiers, unlike, the freezing-out method, for instance, which is generally limited to the use of potassium oleate

EXAMPLE I

A butadiene/styrene rubber latex was prepared by emulsion copolymerization of butadiene with styrene at 5° C. according to the following formulation, in which the figures stand for parts by weight:

| | |
|---|---|
| Butadiene | 71 |
| Styrene | 29 |
| Tert.dodecyl mercaptan | 0.055 |
| Oleic acid | 4.3 |
| KOH of 50% w. | 1.53 |
| Condensed sodium salts of alkyl naphthalene sulfonic acids | 0.5 |
| Potassium sulfate | 0.30 |
| Water | 155 |
| $FeSO_4 \cdot 7H_2O$ | 0.0055 |
| Disodium salt of ethylene diamine tetra-acetic acid | 0.011 |
| Sodium formaldehyde sulfoxylate | 0.055 |
| Para-menthane hydroperoxide | 0.028 |

At the end of 11 hours, the conversion amounted to 60.5% and the reaction was stopped by the addition of 0.15% w. of sodium dimethyl dithiocarbamate and 0.027% w. of sodium nitrite (both calculated on the total quantity of monomer). The copolymer formed had a styrene content of 23.4% w. and a Mooney viscosity of 148. After the unconverted monomer had been removed from the reaction mixture, first by venting and then with the aid of steam, a latex was obtained having a solids content of 25.4% w., a pH of 9.9 and a surface tension at room temperature of 66 dynes/cm.

This latex was divided into six portions that were treated by the process according to the invention (Experiments 1–6). Of some portions the pH was first reduced by passing $CO_2$ through the latex (Experiments 3–6). Each portion of the latex was mixed in a turbomixer at room temperature for 1–2 minutes with a given amount of a mixture of 80 parts by volume of benzene and 20 parts by volume of isopropyl alcohol (IPA). The $\chi$ value of benzene in relation to the copolymer is about 0.4, the solubility of benzene in 100 ml. of water at room temperature is 0.082 g. The solubility of isopropyl alcohol in 100 ml. of water at room temperature is infinite.

The benzene and the IPA were removed azeotropically from the thus produced latices by steam stripping, the resultant foam being broken in a foam breaker and the azeotropic mixture condensed in order to recover the benzene and the IPA. The latices treated contained no coagulate and were subsequently concentrated in a film evaporator at 60° C. until the content of solids was 60–70% w. Of the final latices thus produced the following properties were determined: the pH, surface tension, viscosity (measured, if necessary after dilution, on latices having a solids content of 60% w. and at 25° C. with the aid of a rotating viscometer, using a rotor with a diameter of 24 mm. and applying a speed of rotation of 200 revolutions per minute) and mechanical stability (measured after dilution down to a solids content of 55% w. according to ASTM No. D 1076–59).

Further particulars and results are recorded in Table I.

Table 1

| Exp. No. | pH of Initial Latex | Ratio by Volume of Benzene/ IPA Mixture: Initial Latex | Ratio of Weight of (rubber+ benzene): (water+ IPA) | Final Latex | | | |
|---|---|---|---|---|---|---|---|
| | | | | pH | Surface Tension Dynes/cm. | Viscosity, Centipoises (with 60% w. of solids) | Mechanical Stability, Minutes |
| 1 | 9.9 | 2 | ca 1.6 | 10.1 | 35 | 320 | >30 |
| 2 | 9.9 | 1.5 | ca 1.3 | 10.0 | 48 | 420 | >30 |
| 3 | 8.5 | 1.9 | ca 1.5 | 10.1 | 31 | 86 | >30 |
| 4 | 8.5 | 1.5 | ca 1.3 | 9.7 | 48 | 402 | >30 |
| 5 | 7.6 | 1.5 | ca 1.3 | 9.8 | 34 | 140 | >30 |
| 6 | 7.6 | 1.7 | ca 1.4 | 9.8 | 32 | 98 | >30 |

Of the final latices obtained from Experiments 3, 5 and 6 foam rubbers were made by the process described in British patent specification 332,525. For this the following were added to the latices, calculated per 100 parts by weight of dry polymer (in parts by weight):

| | |
|---|---|
| Sulfur | 2.5 |
| Zinc diethyl dithiocarbamate | 0.95 |
| Zinc mercaptobenzothiazol | 1 |
| Phenolic antioxidant | 0.5 |
| Condensation product of formaldehyde, ammonia and ethyl chloride | 0.8 |
| Sodium carboxymethyl cellulose | 0.1 |

The latices were then stirred for 10 minutes and beaten to a foam having a volume that was from 7 to 8 times the original volume. Towards the end of the beating the following were added (again in parts by weight):

| | |
|---|---|
| ZnO | 5 |
| $Na_2SiF_6$ | 2.4 | after which the latex foams were put into molds and were gelated and vulcanized at 100° C. with the aid of steam.

The resultant foam rubbers had an excellent foam structure and exhibited no wrinkle formation ("elephant hide") when compressed. Some of their other properties are recorded in Table II.

*Table II*

|  | Foam rubbers produced from the final latices of experiment No.: | | |
|---|---|---|---|
|  | 3 | 5 | 6 |
| d=density, g./litre | 88 | 103 | 93 |
| Permanent deformation of 50% compression and 70° C. for 22 h, percent of original thickness | 6 | 7 | 7 |
| Tensile strength, g./cm.$^2$ | 624 | 715 | 625 |
| Elongation at rupture, percent | 260 | 260 | 265 |
| $M_{25}$=modulus at 25% compression, g./cm.$^2$ | 33 | 43.2 | 33.3 |
| $M_{40}$=modulus at 40% compression, g./cm.$^2$ | 45 | 58.0 | 45 |

EXAMPLE II

Experiment No. 5 described in Example I was repeated several times, but each time with the difference that, in the mixture of 80 parts by volume of benzene and 20 parts by volume of isopropyl alcohol, benzene as component A was replaced by the organic liquids listed in Table III. The properties of the final latices then obtained are given in the same table; they were determined in the same manner as in the experiments of Example I.

*Table III*

| Exp. No. | Component A | $\chi$-Value | Solubility in 100 ml of Water, g. | Ratio by Weight of (rubber+A):(water+IPA) | Final Latex | | | |
|---|---|---|---|---|---|---|---|---|
|  |  |  |  |  | pH | Surface Tension, dynes/cm. | Viscosity, Centipoises (with 60% w. of solids) | Mechanical Stability, minutes |
| 7 | Toluene | ca 0.4 | 0.05 (16° C.) | ca 1.3 | 9.9 | 34 | 143 | >30 |
| 8 | Xylene | ca 0.4 | Insoluble | ca 1.2 | 9.9 | 35 | 151 | >30 |
| 9 | Chloroform | ca 0.35 | 1.0 (15° C.) | ca 2.1 | 9.7 | 32 | 97 | >30 |
| 10 | CCl$_4$ | ca 0.35 | 0.08 (20° C.) | ca 2.2 | 9.9 | 34 | 148 | >30 |
| 11 | Cyclohexane | ca 0.5 | Insoluble | ca 1.2 | 9.9 | 39 | 160 | >30 |

EXAMPLE III 100 ml. of a styrene/butadiene rubber latex, prepared as described in Example I and whose solids content was 20% w., pH 9 and surface tension 65 dynes/cm. was mixed with 0.2% w. calculated on dry matter of an emulsifying agent comprising polyvinyl acetate saponified up to 88% w. as a solution of about 3% w. in water. The latex was then treated as described by Example I with 100 ml. of a mixture consisting of 80 parts by volume of benzene and 20 parts by volume of isopropyl alcohol, these components then being removed by steam stripping. For the treatment with the benzene/isopropyl alcohol mixture the ratio by weight of (rubber+benzene) to (water+IPA) was about 0.9. After the latex had next been concentrated to a solids content of 58% w. by film evaporation the final latex was found to have a surface tension of 42 dynes/cm. and a viscosity (with 58% w. of solid matter) of 500 centipoises.

EXAMPLE IV 100 ml. of a styrene/butadiene rubber latex prepared as described in Example I and whose solids content was 25.5% w., whose pH had been reduced with CO$_2$ to 8.5, and whose surface tension was 66 dynes/cm., was treated in a turbomixer with 190 ml. of a mixture consisting of 80 parts by volume of benzene and 20 parts by volume of isopropyl alcohol (IPA), in which mixture 3.8 g. of polystyrene and 0.29 g. of potassium oleate were dissolved. The ratio by weight of (rubber+polystyrene+benzene) to (water+IPA) was about 1.55. After removal of the benzene and IPA by steam stripping the latex was concentrated in a film evaporator to a solids content of 65% w., the latex remaining of a thin liquid consistency. The macromolecular solid particles of this latex were found to consist of an intimate mixture of polystyrene and rubber particles, which could not be separated from each other by centrifuging the latex. The final latex had a pH of 10.2, a surface tension of 32 dynes/cm., mechanical stability of more than 30 minutes and a viscosity (measured in a Brookfield LVF viscometer using spindle 3 at a speed of 30 revolutions per minute) of 420 centipoises.

EXAMPLE V

The experiment described in Example IV was repeated, but with the difference that polystyrene was replaced by 11.4 g. of carbon black (HAF soot) and that no potassium oleate was added to the benzene/IPA mixture. The ratio by weight of (rubber+benzene) to (water+IPA) was about 1.5. After the styrene/butadiene rubber latex had been mixed with the benzene/IPA/soot mixture all the rubber and carbon black was found to have coagulated in the form of an intimate mixture.

EXAMPLE VI 100 ml. of the initial latex mentioned in Example IV was mixed with a dispersion consisting of 25 g. of water, 2.5 g. of carbon black (HAF soot) and 2.5 g. of potassium oleate. Then 200 ml. of a mixture of 80 parts by volume of benzene and 20 parts by volume of IPA was added. The ratio by weight of (rubber+benzene) to (water+IPA) was about 1.3. After some minutes' mixing in a turbomixer, during which partial coagulation took place, the benzene and IPA were removed from the mixture by steam stripping. After removal of the coagulum formed a stable latex was obtained that contained, calculated on rubber, 10% w. of carbon black incorporated in the rubber particles. This latex was next concentrated to 45% w. of solids and a dispersion suitable for dipping processes was obtained that was still stable.

EXAMPLE VII 80 g. of a styrene/butadiene rubber latex of 25% w., prepared as described in Example I, was mixed with 20 g. of a 25% w. "high-styrene resin" latex prepared according to the same formulation, but with 20 parts by weight of butadiene and 80 parts by weight of styrene instead of 71 parts by weight of butadiene and 29 parts by weight of styrene. This mixture of latices, the pH of which was adjusted to 8.5 and of which the surface tension was 65 dynes/cm. was treated in a turbomixer for some minutes with 190 ml. of a mixture consisting of 80 parts by volume of benzene and 20 parts by volume of isopropyl alcohol (IPA). The ratio by weight of (rubber+high-styrene resin+benzene) to (water+IPA) was about 1.5. After removal of the organic processing liquids in a steam stripper the resultant latex was concentrated in a film evaporator to a solids content of 64% w. When measured in accordance with ASTM No. D 1076–59 this latex still had a mechanical stability of 33 dynes/cm. The final latex consisted of a stable dispersion of agglomerations composed of particles of the two styrene/butadiene copolymers. From the concentrated final latex a good foam rubber reinforced with high-styrene resin could be made following the recipe described in Example I.

EXAMPLE VIII 100 parts by volume of a 25% w. butadiene acrylonitrile copolymer latex, prepared by emulsion polymerization with the aid of potassium oleate as the emulsifier and of which the copolymer was built up of 68% w. of butadiene and 32% w. of acrylonitrile and which had a Mooney viscosity of 50, were mixed with 50 parts by volume of a 25% w. polyvinyl chloride (PVC) latex obtained by emulsion polymerization with the aid of potassium laurate as the emulsifier, the intrinsic viscosity of the PVC being 0.9. The pH of the latex mixture was adjusted to 9.0. The mixture was then mixed in a turbomixer for 2 minutes with a mixture of 90 parts by volume of chloroform and 10 parts by volume of isopropyl alcohol (IPA). The ratio by volume of (nitrile rubber+PVC+chloroform) to (water+IPA) was about 2.3. The $x$ value of chloroform in relation to the butadiene/acrylonitrile copolymer is about 0.2. The solubility of chloroform in 100 ml. of water is about 1 g.

After removal of the chloroform and IPA a latex was obtained of which the solid phase consisted of agglomerated particles composed of a mixture of butadiene/acrylonitrile copolymer and polyvinyl chloride. Coagulation of this latex yielded an excellent "poly blend" which, after vulcanization, was resistant to ageing, as well as to ozone and oil.

EXAMPLE IX

A latex of styrene/butadiene rubber was prepared by emulsion polymerization at 5° C., according to the following formulation, in which the figures stand for parts by weight:

| | |
|---|---|
| Butadiene | 71 |
| Styrene | 29 |
| Tert.dodecyl mercaptan | 0.05 |
| Rosin potassium soap | 2.11 |
| Sodium stearate | 2.07 |
| Condensed sodium salts of alkyl naphthalene sulfonic acids | 0.02 |
| Tert.potassium phosphate | 0.40 |
| Water | 200 |
| $FeSO_4 \cdot 7H_2O$ | 0.012 |
| Disodium salt of ethylenediamine tetra-acetic acid | 0.015 |
| Sodium formaldehyde sulfoxylate | 0.03 |
| Para-menthane hydroperoxide | 0.072 |

Polymerization was interrupted at a conversion of 54% in the manner described in Example I. The styrene content of the copolymer formed was 22.5% w. After the non-converted monomer had been removed from the reaction mixture, first by venting and then by means of steam, a latex was obtained having a content of solid matter of 18% w. (latex I). Some of this latex was concentrated by film evaporation to a solids content of 35% w. (latex II). Both latex I and latex II were divided into several portions and each portion was treated with a mixture of benzene and isopropyl alcohol (IPA), the ratio by volume of benzene/IPA mixture to latex and/or the ratio by volume of benzene to IPA being varied. After contact with the organic liquids, which again took place at room temperature in a turbomixer for 1–2 minutes, the benzene and IPA were removed in a steam stripper, the residence time in this stripper being 20 minutes. Some of the latices thus produced were further concentrated in a film evaporator to a solids content of 60% w. Before and after these treatments a number of properties of the latices were determined. The results of these determinations and further particulars concerning the treatments are recorded in Tables IV, V and VI.

Table IV

| Properties before Benzene/IPA Treatment | Latex I | Latex II |
|---|---|---|
| Content of solids, percent w | 18 | 36 |
| Polymer Concentration, percent w | 16.6 | 33.2 |
| Soap concentration, percent w | 1.4 | 2.8 |
| Surface tension, dynes/cm | 60 | 60 |
| pH | 7.4 | 7.4 |

Table V

LATEX I

| Exp. No. | Ratio by Volume of Benzene/IPA mixture (80:20):latex | Ratio by Weight of Rubber+Benzene/Water+IPA | Surface Tension After Benzene/IPA Treatment, Dynes/cm. | pH After Benzene/IPA Treatment | After Concentration to Solids Content of 60% w. | |
|---|---|---|---|---|---|---|
| | | | | | Surface Tension, Dynes/cm. | Soap Concentration, percent w. |
| 1 | 1:2 | ca 0.6 | 52 | | | |
| 2 | 1:1 | ca 0.9 | 41 | | | |
| 3 | 2:1 | ca 1.4 | 33 | 9.8 | 34 | 4.66 |
| 4 | 4:1 | ca 2.1 | (¹) | | | |

LATEX II

| 5 | 1:2 | 1 | 46 | | | |
|---|---|---|---|---|---|---|
| 6 | 1:1 | 1.3 | 35 | 9.4 | 36 | 4.66 |

¹ Partial coagulation.

Table VI

LATEX I

| Exp. No. | Ratio by Volume of Benzene: IPA | Ratio by Volume of Benzene/IPA Mixture:Latex | Ratio by Volume of Rubber+Benzene/Water+IPA | Surface Tension After Benzene/IPA Treatment |
|---|---|---|---|---|
| 1 | 80:20 | 1:2 | ca 0.6 | 52 |
| 2 | 80:20 | 1:1 | ca 0.9 | 41 |
| 7 | 70:30 | 1:2 | ca 0.5 | (¹) |
| 8 | 70:30 | 1:1 | ca 0.8 | 36 |
| 9 | 50:50 | 1:1 | ca 0.5 | (²) |
| 10 | 100:0 | 1:1 | ca 1.3 | 59 |

¹ Partial coagulation.
² Complete coagulation.

EXAMPLE X

A butadiene/styrene rubber latex was prepared by emulsion polymerization at 5° C. according to the following formulations (in parts by weight):

| | |
|---|---|
| Butadiene | 70 |
| Styrene | 30 |
| Tert.dodecyl mercaptan | 0.08 |
| Potassium oleate | 2.52 |
| Condensed sodium salts of alkyl naphthalene sulfonic acids | 0.02 |
| Tert.sodium phosphate | 0.70 |
| Water | 200 |
| $FeSO_4 \cdot 7H_2O$ | 0.02 |
| Disodium salt of ethylenediamine tetra-acetic acid | 0.025 |
| Sodium formaldehyde sulfoxylate | 0.05 |
| Para-menthane hydroperoxide | 0.06 |

Polymerization was interrupted at a conversion of 60% and the monomer removed from the latex as described in Example I. The resultant latex, of which the pH was 10.4, the solids content 20% w. and the surface tension 69 dynes/cm., was divided into two portions, A and B. Of one of the portions (B) the pH was reduced to 7.5 by passing in $CO_2$. Both latex portions were then treated with twice their volume of a mixture consisting of 80 parts by volume of benzene and 20 parts by volume of isopropyl alcohol (IPA). The ratio by weight of (rubber+benzene) to (water+IPA) was about 1.4. After removal of the organic liquids by steam stripping, and concentration of the two dispersions to 60% w. the surface tension and viscosity of the resultant latices were determined. The viscosity was measured in the Brookfield LVF viscometer applying spindle 3 at 30 revolutions per minute. The results are given in Table VII.

Table VII

| Latex | pH Before Treatment | After Treatment with Benzene/IPA, Steam Stripping and Concentration: | | |
|---|---|---|---|---|
| | | pH | Surface Tension, dynes/cm. | Viscosity (Brookfield Viscometer) |
| A | 10.4 | 10.5 | 46 | 2,400 |
| B | 7.5 | 10.0 | 34 | 280 |

EXAMPLE XI

A butadiene/styrene rubber latex was prepared by emulsion copolymerization of butadiene with styrene at 5° C., according to the following formulation in which the figures stand for parts by weight:

| | |
|---|---|
| Butadiene | 70 |
| Styrene | 30 |
| Tert.dodecyl mercaptan | 0.08 |
| Potassium stearate | 4.5 |
| Condensed sodium salts of alkyl naphthalene sulfonic acids | 0.02 |
| Tert.sodium phosphate | 0.07 |
| Water | 200 |
| $FeSO_4 \cdot 7H_2O$ | 0.02 |
| Disodium salt of ethylenediamine tetra-acetic acid | 0.025 |
| Sodium formaldehyde sulfoxylate | 0.05 |
| Para-menthane hydroperoxide | 0.06 |

Polymerization was interrupted at a conversion of 60% as described in Example I. The unconverted monomer was removed from the reaction mixture first by venting and then by means of steam. The resultant latex contained 20% w. of solids. The pH of the latex was 9.5, the surface tension 69 dynes/cm. The copolymer had a styrene content of 23.5% w. and a Mooney viscosity of 150.

This latex was divided into several portions, which were treated with the mixtures listed in Table VIII, applying a ratio by volume of a mixture of organic liquids:latex of 1:1, after which the organic liquids were removed by means of steam. Of the resultant latices the content of coagulate and the surface tension were determined. The results of these experiments are also recorded in Table VIII.

Table VIII

| Exp. No. | Composition of Treating Mixture | | | Ratio by Weight of Rubber+A/Water+B | Quantity of Coagulate in Final Latex, Percent w. Calculated on Polymer | Surface Tension of Final Latex, dynes/cm. |
|---|---|---|---|---|---|---|
| | Component A | Component B | Ratio by Volume of A:B | | | |
| 1 | Benzene | Ethanol | 95:5 | ca 1.2 | 0 | 47 |
| 2 | do | do | 90:10 | ca 1.1 | 0 | 52 |
| 3 | do | do | 80:20 | ca 0.9 | 0 | 57 |
| 4 | do | Sec. butanol | 95:5 | ca 1.2 | 0 | 55 |
| 5 | do | do | 90:10 | ca 1.1 | 0 | 47 |
| 6µ | do | do | 80:20 | ca 0.9 | 0 | 47 |
| 7 | do | Isopropanol | 95:5 | ca 1.2 | 0 | 45 |
| 8 | do | do | 80:20 | ca 0.9 | 0 | 45 |
| 9 | Benzene | Acetone | 0:100 | ca 0.1 | 100 | -- |
| 10 | Benzene | do | 97.5:2.5 | ca 1.3 | 0 | 57 |
| 11 | do | do | 95:5 | ca 1.2 | 0 | 40 |
| 12 | do | do | 90:10 | ca 1.1 | 0 | 45 |
| 13 | do | do | 80:20 | ca 0.9 | 0 | 51 |
| 14 | do | do | 70:30 | 0.85 | 0 | 58 |
| 15 | do | Methyl ethyl ketone. | 95:5 | ca 1.2 | ca 5 | 60 |
| 16 | do | do | 90:10 | ca 1.1 | ca 2 | 55 |
| 17 | do | do | 80:20 | ca 0.9 | 0 | 52 |
| 18 | do | Diacetone alcohol. | 95:5 | ca 1.2 | 0 | 40 |
| 19 | do | do | 90:10 | ca 1.1 | 0 | 48 |
| 20 | do | do | 80:20 | ca 0.9 | 0 | 52 |
| 21 | do | Methyl Cellosolve. | 95:5 | ca 1.2 | 0 | 42 |
| 22 | do | do | 90:10 | ca 1.1 | 0 | 40 |
| 23 | do | do | 80:20 | ca 0.9 | 0 | 45 |
| 24 | | do | 100:0 | ca 1.35 | ca 40 | 60 |

EXAMPLE XII

A butadiene/styrene rubber latex was prepared at 5° C. according to the following formulation, in which the figures stand for parts by weight:

| | |
|---|---|
| Butadiene | 71 |
| Styrene | 29 |
| Tert.dodecyl mercaptan | 0.055 |
| Potassium oleate | 4.0 |
| Condensed sodium salts of alkyl naphthalene sulfonic acids | 0.5 |
| $(NH_4)_2SO_4$ | 0.3 |
| Water | 150 |
| $FeSO_4 \cdot 7H_2O$ | 0.016 |
| Disodium salt of ethylenediamine tetra-acetic acid | 0.020 |
| Sodium formaldehyde sulfoxylate | 0.04 |
| Para-menthane hydroperoxide | 0.048 |

Polymerization was interrupted as indicated in Example I at a conversion of 60%. The copolymer formed had a styrene content of 23.4% w. After the unconverted monomer had been removed from the reaction mixture, first by venting and then by steam stripping, a latex was obtained having a solids content of 25% w., a surface tension of 69 dynes/cm. and a pH of 7.5. This latex was divided into three portions, of which one was diluted to a solids content of 20% w., one portion left at the same concentration and one concentrated to a solids content of 28% w. Each of the three latices were divided into several smaller portions, which were each treated with a mixture of benzene as component A and acetone or isopropyl alcohol (IPA) as component B. Components A and B were again removed from the latices treated by steam stripping. In Table IX the ratio by volume of component A to component B, the ratio by volume of each of the mixtures of A and B to the latex, the ratio by weight of rubber + A to water + B, and the amount of coagulate in and the surface tension of the final latices is given for each experiment.

Table IX

| Exp. No. | Solids Content of Initial Latex, Percent w. | Component B | Ratio by Volume of A:B | Ratio by Volume of A+B/Latex | Ratio by Weight of Rubber+A/Water+B | Final Latex | |
|---|---|---|---|---|---|---|---|
| | | | | | | Quantity of Coagulate, Calculated on Polymer | Surface Tension, Dynes/cm. |
| 1 | 20 | Acetone | 80:20 | 1 | ca 0.9 | ca 1 | 64 |
| 2 | | do | 70:30 | 1 | ca 0.8 | ca 11 | 66 |
| 3 | | do | 60:40 | 1 | ca 0.65 | ca 3 | 63 |
| 4 | 25 | do | 80:20 | 1 | ca 1.0 | ca 4 | 54 |
| 5 | 28 | do | 90:10 | 1 | ca 1.3 | ca 3 | 57 |
| 6 | | do | 80:20 | 1 | ca 1.1 | ca 1 | 56 |
| 7 | | do | 70:30 | 1 | ca 0.9 | ca 1 | 57 |
| 8 | | do | 60:40 | 1 | ca 0.7 | >20 | |
| 9 | 20 | IPA | 95:5 | 1 | ca 1.2 | ca 14 | 54 |
| 10 | | do | 90:10 | 1 | ca 1.1 | ca 2 | 60 |
| 11 | | do | 80:20 | 1 | ca 0.9 | ca 5 | 54 |
| 12 | | do | 70:30 | 1 | ca 0.8 | ca 14 | 51 |
| 13 | | do | 60:40 | 1 | ca 0.65 | >20 | |
| 14 | 25 | do | 80:20 | 1 | ca 1.0 | ca 1 | 45 |
| 15 | | do | 80:20 | 2 | ca 1.6 | ca 1 | 28 |
| 16 | 28 | do | 95:5 | 1 | ca 1.5 | ca 2 | 54 |
| 17 | | do | 90:10 | 1 | ca 1.3 | ca 1 | 53 |
| 18 | | do | 80:20 | 1 | ca 1.1 | ca 1 | 53 |
| 19 | | do | 70:30 | 1 | ca 0.9 | >20 | |
| 20 | | do | 60:40 | 1 | ca 0.8 | >20 | |

EXAMPLE XIII

A number of butadiene/styrene rubber latices were prepared at 5° C. according to the formulation mentioned in Example XII, the difference being that the nature and quantity of electrolyte were varied and that in some of the experiments a different amount of water was also used. The pH of the latices containing the electrolyte $(NH_4)_2SO_4$ had a pH of 7.5 after the removal of the monomer by steam treatment. The pH of the other Table X

| Experiment No. | 1 | 2a | 2b | 3a | 3b | 4a | 4b | 5 | 6a | 6b | 7a | 7b | 8a | 8b |
|---|---|---|---|---|---|---|---|---|---|---|---|---|---|---|
| Water in polymerization recipe, p.b.w. | 150 | 150 | | 150 | | 150 | | 200 | 200 | | 200 | | 200 | |
| Nature and quantity of electrolyte in polymerization recipe, p.b.w. | 0 | $K_2SO_4$ 0.1 | | $K_2SO_4$ 0.3 | | $(NH_4)_2SO_4$ 0.3 | | 0 | $K_2SO_4$ 0.1 | | $K_2SO_4$ 0.3 | | $(NH_4)_2SO_4$ 0.3 | |
| Visual viscosity after interruption of polymerization | Jelly | Highly Viscous | | Low-Viscous | | Low-Viscous | | Highly Viscous | Viscous | | Low-Viscous | | Low-Viscous | |
| Average rate of polymerization at which 60% conversion was reached, percent conversion per hour | 8.5 | 8.5 | | 8.5 | | 8.5 | | 7.0 | 7.0 | | 7.0 | | 7.0 | |
| Solids content of latex before treatment with A+B | | 28 | | 28 | | 28 | | 20 | 20 | | 20 | | 20 | |
| Quantity of Coagulate in Latex, percent w. on Polymer: | | | | | | | | | | | | | | |
| Before treatment with A+B | | <1 | | <1 | | <1 | | | <1 | | <1 | | <1 | |
| After treatment with A+B, with ratio by volume of A+B/latex=1:1 and after steam stripping | | ca 3 | | <1 | | 0 | | | ca 3 | | ca 1 | | 0 | |
| After treatment with A+B, with ratio by volume of A+B/latex=2:1 and after steam stripping | | | 1.7 | | 1.7 | | 0 | | | 1.7 | | 3 | | 0 |
| Surface Tension, dynes/cm.: | | | | | | | | | | | | | | |
| Before treatment with A+B | | 69 | | 68 | | 69 | | | 68 | | 67 | | 69 | |
| After treatment with A+B, with ratio by volume of A+B/latex=1:1 and after steam stripping | | 50 | | 52 | | 44 | | | 54 | | 52 | | 45 | |
| After treatment with A+B with ratio by volume of A+B/latex=2:1 and after steam stripping | | | 34 | | 32 | | 29 | | | 31 | | 32 | | 28 |
| Ratio by weight of Rubber+A/Water+B | | ca 1.1 | ca 1.6 | ca 1.1 | ca 1.6 | ca 1.1 | ca 1.6 | | ca 0.9 | ca 1.4 | ca 0.9 | ca 1.4 | ca 0.9 | ca 1.4 | latices was 10. By passing in $CO_2$ the pH of these latices was reduced to 7.5 too. All the latices were treated with mixture of benzene and isopropyl alcohol (A+B) in the ratio by volume of A:B=80:20, the ratio by volume of the benzene/IPA mixtures to latex being varied. After this treatment the benzene and IPA were removed again by steam stripping. Further data on these experiments are provided in Table X, where the results regarding coagulate formation and surface tension are also given.

EXAMPLE XIV

An aqueous latex of polyisoprene consisting predominantly of the cis-1,4 configuration was prepared by emulsification of a 10% w. solution of the polyisoprene in isopentane with the aid of potassium oleate as the emulsifier, followed by stripping off the solvent with steam and concentration to 25% w. of solids. This latex had a surface tension of 30 dynes/cm. 80 g. of this latex was mixed with 20 g. of a 25% w. "high styrene resin" latex having a surface tension of 65 dynes/cm. and which had been prepared by emulsion polymerization of 20 parts by weight of butadiene and 80 parts by weight of styrene by the method described in Example VII. This mixture of latices, the pH of which was adjusted to 8.5, was treated for some minutes in a turbomixer with 150 ml. of a mixture consisting of 80 parts by volume of benzene and 20 parts by volume of isopropyl alcohol (IPA). The ratio by weight of $$\frac{\text{polyisoprene}+\text{"high styrene resin"}+\text{benzene}}{\text{water}+\text{IPA}}$$

was about 1.4. After removal of the organic treating liquids in a steam stripper, the resultant latex was concentrated in a film evaporator to a solids content of 64% w. The stability of this latex (measured according to ASTM No. D 1076-59) was more than 30 minutes, the surface tension 33 dynes/cm. The final latex had a surface tension of 30 dynes/cm. and consisted of a stable dispersion of agglomerates made up of polyisoprene particles and particles of high-styrene resin. From the concentrated final latex a good polyisoprene foam rubber reinforced with "high styrene resin" could be made, applying the formulation described in Example I.

EXAMPLE XV

A butadiene/styrene rubber latex was prepared by emulsion copolymerization of butadiene with styrene at 5° C., according to the following formulation, in which the figures stand for parts by weight:

| | |
|---|---|
| Butadiene | 71 |
| Styrene | 29 |
| Tert.dodecyl mercaptan | 0.055 |
| Oleic acid | 4.3 |
| KOH of 50% w. | 1.53 |
| Condensed sodium salts of alkyl-naphthalene sulfonic acids | 0.5 |
| Potassium sulfate | 0.30 |
| Water | 155 |
| $FeSO_4 \cdot 7H_2O$ | 0.0055 |
| Disodium salt of ethylene diamine tetra-acetic acid | 0.011 |
| Sodium formaldehyde sulfoxylate | 0.055 |
| Para-menthane hydroperoxide | 0.028 |

At the end of 11 hours the conversion was 60.5% and the reaction was stopped by the addition of 0.15% w. of sodium dimethyl dithiocarbamate and 0.027% w. of sodium nitrite (both calculated on the total amount of monomer). The copolymer formed had a styrene content of 23.4% w. and a Mooney viscosity of 148. After the unconverted monomer had been removed from the reaction mixture, first by venting and then with the aid of steam, a latex was obtained with a solids content of 25.4% w., a pH of 9.9 and a surface tension at room temperature of 66 dynes/cm.

This latex was divided into 4 portions, which were processed by the method according to the invention (Experiments 1–4). Of some portions the pH was first reduced bypassing $CO_2$ through the latex (Experiments 3 and 4). Each portion of latex was mixed in a turbomixer at room temperature for one to two minutes with a given quantity of a mixture of 80 parts by volume of benzene and 20 parts by volume of methyl alcohol. The $\chi$ value of benzene in relation to the copolymer is about 0.4; its solubility in 100 ml. of water at room temperature is 0.082. The solubility of methanol in 100 ml. of water at room temperature is infinite.

The benzene and methanol were removed from the latices thus produced by steam stripping, the foam formed being broken in a foam breaker and the mixture condensed in order to recover the benzene and the methanol. The latices treated contained no coagulate and were subsequently concentrated in a film evaporator at 60° C. until the solids content was 60–70% w. Of the final latices thus obtained the following properties were determined: the pH, surface tension, viscosity (measured, if necessary after dilution, at a solids content of 60% w. and at 25° C. with a rotating viscometer of the Drage type, using a rotor having a diameter of 24 mm. and applying a rotation speed of 200 revolutions per minute) and mechanical stability (measured after dilution down to a solids content of 55% w. according to ASTM No. D 1076-59).

Further particulars and results are recorded in Table XI.

*Table XI*

| Exp. No. | pH of Initial Latex | Volume of Benzene/Methanol Mixture: Initial Latex | Ratio by Vol. (rubber +benzene): (water+methanol) | Final Latex | | | |
|---|---|---|---|---|---|---|---|
| | | | | pH | Surface Tension, dynes/cm. | Viscosity, Centipoises (at 60% w. solids content) | Mechanical Stability, Minutes |
| 1 | 9.9 | 2 | ca 1.6 | 10.0 | 35 | 340 | >30 |
| 2 | 9.9 | 1.5 | ca 1.3 | 10.0 | 46 | 460 | >30 |
| 3 | 8.5 | 1.9 | ca 1.5 | 10.0 | 31 | 80 | >30 |
| 4 | 8.5 | 1.5 | ca 1.3 | 9.8 | 48 | 480 | >30 |

Of the final latex obtained from Experiment 3 a foam rubber was made by the Dunlop process described in British patent specification No. 332,525. To this end the following (in parts by weight), calculated per 100 parts by weight of dry polymer, were added to the latex:

| | |
|---|---|
| Sulfur | 2.5 |
| Zinc diethyl dithiocarbamate | 0.95 |
| Zinc mercaptobenzothiozol | 1 |
| Phenolic anti-oxidant | 0.5 |
| Condensation product of formaldehyde, ammonia and ethyl chloride | 0.8 |
| Sodium carboxymethyl cellulose | 0.1 |

The latex was then stirred for 10 minutes and beaten to a foam having a volume 7 to 8 times the original volume. Towards the end of the beating the following (again in parts by weight) were added:

| | |
|---|---|
| ZnO | 5 |
| $Na_2SiF_6$ | 2.4 | after which the latex foam was put into molds and gelated and vulcanized at 100° C. with the aid of steam.

The resultant foam rubber had an excellent foam structure, exhibited no wrinkle formation ("elephant hide") when compressed and had the following other properties:

| | |
|---|---|
| $d$=density, g./litre | 101 |
| Permanent deformation at 50% compression and 70° C. for 22 hours, percent of original thickness | 6 |
| Tensile strength, g./cm.$^2$ | 650 |
| Elongation at rupture, percent | 275 |
| $M_{25}$=modulus at 25% compression, g./cm.$^2$ | 35 |
| $M_{40}$=modulus at 40% compression, g./cm.$^2$ | 47 |

EXAMPLE XVI

Experiment No. 3 described in Example XV was repeated several times, each time with the difference that, in the mixture of 80 parts by volume of benzene and 20 parts by volume of methanol, benzene as component A was replaced by the organic liquids listed in Table XII. The properties of the final latices thus produced are given in the same table; they were determined in the same manner as in the experiments of Example XV.

black was found to have coagulated in the form of an intimate mixture.

EXAMPLE XIX

A butadiene/styrene rubber latex was prepared by emulsion copolymerization of butadiene with styrene at 5° C., according to the following formulation, in which the figures stand for parts by weight:

| | |
|---|---|
| Butadiene | 70 |
| Styrene | 30 |
| Tert. dodecyl mercaptan | 0.08 |
| Potassium stearate | 4.5 |
| Condensed sodium salts of alkyl naphthalene sulfonic acids | 0.02 |
| Tert. sodium phosphate | 0.70 |
| Water | 200 |
| $FeSO_4 \cdot 7H_2O$ | 0.02 |
| Disodium salt of ethylene diamine tetra-acetic acid | 0.025 |
| Sodium formaldehyde sulfoxylate | 0.05 |
| Para-menthane hydroperovide | 0.06 |

*Table XII*

| Exp. No. | Component A | x-Value | Solubility in 100 ml of Water, grammes | Ratio by wt. of (rubber+A): (water+methanol) | Final Latex ||||
|---|---|---|---|---|---|---|---|---|
| | | | | | pH | Surface Tension, dynes/cm. | Viscosity, Centipoises (at 60% w. of solids) | Mechanical Stability, minutes |
| 5 | Toluene | ca 0.4 | 0.05 (16° C.) | ca 1.3 | 9.9 | 33 | 83 | >30 |
| 6 | Chloroform | ca 0.35 | 1.0 (15° C.) | ca 2.1 | 9.7 | 31 | 80 | >30 |

EXAMPLE XVII 100 ml. of a styrene/butadiene rubber latex, prepared as described in Example XV, and whose solids content was 25.5% w., whose pH had been reduced by $CO_2$ to 8.5 and whose surface tension was 66 dynes/cm. was treated in a turbomixer with 190 ml. of a mixture consisting of 80 parts by volume of benzene and 20 parts by volume of methanol, in which mixture 3.8 g. of polystyrene and 0.29 g. of potassium oleate were dissolved. The ratio by weight of (rubber+polystyrene+benzene) to (water+methanol) was about 1.55. After removal of the benzene and methanol by steam stripping, the latex was concentrated in a film evaporator to a solids content of 65% w., the latex remaining of a thin liquid consistency. The macromolecular solid particles of this latex proved to consist of an intimate mixture of polystyrene and rubber particles, which could not be separated from each other by centrifuging the latex. The final latex had a pH of 10.0, a surface tension of 32 dynes/cm., a mechanical stability of more than 30 minutes and a viscosity (measured with the aid of a Brookfield LVF viscometer using spindle 3 at a speed of 30 r.p.m.) of 390 centipoises.

EXAMPLE XVIII

The experiment described in Example XVII was repeated, but with the difference that polystyrene was replaced by 11.4 g. of carbon black (HAF soot) and that no potassium oleate was added to the benzene/methanol mixture. The ratio by weight of (rubber+benzene) to (water+methanol) was about 1.5. After the styrene/butadiene rubber latex had been mixed with the benzene/methanol/soot mixture all the rubber and carbon Polymerization was stopped at a conversion of 60% in the manner described in Example XV. The unconverted monomer was removed from the reaction mixture first by venting and then with the air of steam. The latex produced contained 20% w. of solids. The pH of the latex was 9.5, the surface tension 69 dynes/cm. The copolymer had a styrene content of 23.5% w. and a Mooney viscosity of 150.

This latex was divided into two portions, which were treated with the mixtures of benzene and methanol listed in Table IV, applying a ratio by volume of mixture of organic liquids:latex=1:1, after which the organic liquids are removed with the aid of steam. Of the final latices thus produced the coagulate content and the surface tension were determined. The results of these experiments are also given in Table XIII.

*Table XIII*

| Exp. No. | Ratio by Volume of Benzene: Methanol | Ratio by Weight of rubber+benzene/water+methanol | Amount of Coagulate in Final Latex, Percent w., Calculated on Polymer | Surface Tension of Final Latex, dynes/cm. |
|---|---|---|---|---|
| 1 | 90:10 | ca 1.1 | 0 | 49 |
| 2 | 80:20 | ca 0.9 | 0 | 47 |

EXAMPLE XX

An aqueous latex of polyisoprene consisting predominantly of the cis-1,4 configuration was prepared by emulsifying a 10% w. solution of the polyisoprene in isopentane, with the aid of potassium oleate as the emulsifier, followed by stripping off the solvent with steam and concentration of 25% w. of solids. This latex had a surface tension of 30 dynes/cm. 80 g. of this latex was mixed with 20 g. of a 25% w. "high-styrene resin" latex having a surface tension of 65 dynes/cm. and which had been prepared by emulsion polymerization of 20 parts by weight of butadiene and 80 parts by weight of styrene using the formulation described in Example XV. This mixture of latices, the pH of which was adjusted to 8.5, was treated for some minutes in a turbomixer with 150 ml. of a mixture consisting of 80 parts by volume of benzene and 20 parts by volume of methanol. The ratio by weight of polyisoprene+"high-styrene resin"+benzene
water+methanol was about 1.4. After removal of the organic treating liquids in a steam stripper the resultant latex was concentrated in a film evaporator to a solids content of 64% w. The stability of this latex (measured according to ASTM No. D 1076–59) was more than 30 minutes, its surface tension 33 dynes/cm. The final latex had a surface tension of 30 dynes/cm. and consisted of a stable dispersion of agglomerates made up of polyisoprene particles and "high-styrene resin" particles. From the concentrated final latex and applying the formulation given in Example XV a good polyisoprene foam rubber reinforced with high-styrene resin could be prepared.

We claim as our invention:

1. A process for agglomeration of aqueous styrene-butadiene copolymer latices subsequent to completion of copolymerization which comprises:
   (1) intimately mixing therewith a monocyclic hydrocarbon component A of the group consisting of benzene, alkylated benzenes, $C_{5-6}$ cycloaliphatic hydrocarbons and mixtures thereof; and an oxygen-containing normally liquid organic compound component B of the group consisting of lower aliphatic ketones, $C_{1-4}$ saturated aliphatic alcohols and mixtures thereof for at least about 1 minute while maintaining the water and components A and B in liquid state; the volume ratio of A:B being between 10:90 and 99:1; the weight ratio of copolymer plus A to water plus B being between 0.5:1 and 5:1;
   (2) and thereafter azeotropically distilling essentially all of A and B from the treated latex, whereby a latex having agglomerated particles is formed.

2. A process as claimed in claim 1, characterized in that in the treatment the ratio by weight of the sum of the copolymer and component A to the sum of water and component B is between 0.5 and 3.

3. A process as claimed in claim 1 wherein component B is mixed with the latex simultaneously with component A.

4. A process according to claim 1 werein the latices to be treated are obtained by emulsion polymerization and component A is added to the latices after the polymerization has been concluded.

5. A process according to claim 1 wherein the latices of the solid copolymer are mixed, besides with components A and B, with a filler.

6. A process according to claim 1 wherein the component A is benzene.

7. A process according to claim 1 wherein the compotent A is an alkylated benzene.

8. A process according to claim 1 wherein component A is a saturated cycloaliphatic hydrocarbon with 5–6 carbon atoms per molecule.

9. A process according to claim 1 wherein component B is a monohydric saturated aliphatic alcohol with 2–4 carbon atoms in the molecule.

10. A process according to claim 9 wherein component B is isopropyl alcohol.

11. A process according to claim 1 wherein component B is acetone.

12. A process according to claim 1 wherein component B is methanol.

References Cited by the Examiner

UNITED STATES PATENTS 2,846,427   8/1958   Findlay _____ 260—85.1

MURRAY TILLMAN, *Primary Examiner.*

LEON J. BERCOVITZ, *Examiner.*